Patented Sept. 1, 1936

2,053,174

UNITED STATES PATENT OFFICE 2,053,174

THERMAL DECOMPOSITION OF FLUORO COMPOUNDS

Harold Simmons Booth, Cleveland Heights, Ohio

No Drawing. Application June 27, 1932, Serial No. 619,527

7 Claims. (Cl. 23—88)

This invention relates to the preparation and purification of certain chemicals and mineral products and has for its object the provision of a new and improved process for producing controlled physical conditions for the performance of certain steps of preparation, purification, composition and decomposition. It is well known that many chemical reactions occur more readily at elevated temperatures than at ordinary temperatures, and further that the direction of some chemical reactions vary with the temperature. It is practically a difficult matter, however, to subject many chemicals to a definitely controlled temperature, especially those chemicals which are of a granular or pulverized nature, since such substances usually have a very restricted conductivity for heat. I have discovered that certain chemical operations can be facilitated very greatly by performing them in contact with a molten anhydrous substance which does not decompose at the temperature employed nor enter into chemical reaction with the raw material or any of its products. I ascribe this action, partly to the greater accuracy with which temperature can be controlled, and partly to the greater concentration of the solution thereby produced which is often far more concentrated than is possible to obtain with water, even when any solution at all is obtainable with water, and partly to the fact that certain reactions occur at quite different temperatures in a molten bath than in the open air. Furthermore the high temperature employed greatly speeds the operation and leads to many reactions not obtainable under other conditions.

An example of a thermally controlled reaction employing a molten salt, and independent of its solubility in water is found in the production of sodium fluoride. If an alkali carbonate or sulphate be added to a solution of calcium or magnesium fluoride in the molten salt a double decomposition occurs producing an alkali earth metal compound (the same reactions occur with barium or strontium fluorides, though these substances do not occur in sufficient amount to constitute practicable ores). The reaction in the molten salt does not proceed to completion but only to equilibrium; however if an alkali carbonate be used as the reagent and the temperature be raised gradually the calcium carbonate is decomposed into calcium oxide which is insoluble in the molten salt, and carbon dioxide which is evolved, thereby permitting more of the reaction to continue until complete conversion of the calcium fluoride has occurred; and if the temperature be raised still a little higher the alkali fluoride can be sublimed out, and by decanting the molten mass from the lime and adding more fluorspar the operation can be made nearly continuous with a high degree of heat economy, since the excess temperature of the bath necessary to complete the reaction will serve to heat the freshly added ingredients. In case the sulphate of the alkali be added as a reagent it is necessary to separate the end products from the melt by solution in water.

If magnesium fluoride be the raw material employed and an alkali carbonate be the reagent, the reaction is even simpler, in that the resulting magnesium carbonate is unstable at any temperature of the molten bath and breaks down to magnesium oxide and carbon dioxide without the necessity of raising the temperature.

Another application of my invention consists in the production of sodium fluoride from sodium fluosilicate. It is well known that silicon tetrafluoride, a by-product of the manufacture of phosphorus fertilizer, cannot be vented into the atmosphere in large quantities without damage to the neighborhood. It is therefore customary to absorb this in sodium chloride solution and convert it to sodium fluosilicate. The market cannot absorb, at a profitable price, all of the sodium fluosilicate that could be produced, therefore, it is advantageous to be able to convert the sodium fluosilicate into a more salable product. When sodium fluosilicate is heated at a high temperature silicon tetrafluoride is evolved and sodium fluoride is left as a residue. This residue, however, is very dense and is therefore unsuitable as a roach powder, which is the chief use of sodium fluoride. I have found that when sodium fluosilicate or other similar fluosilicates are added to fused sodium chloride or other similar water soluble substances which are melted without decomposition and will not react with the fluoride, that the fluosilicate immediately decomposes yielding a fluoride which dissolves in the melt and pure silicon tetrafluoride gas, both of which are useful. The silicon tetrafluoride evolved may be absorbed in a solution of sodium chloride, thus regenerating part of the sodium fluosilicate, which can then be sent back through the process or used in any other suitable manner. The sodium fluoride in the fused melt is then separated from the fused melt in any suitable fashion. As an example of one procedure, it may be volatilized and thus separated although I prefer to quench the fusion into a saturated solution of the fluoride in question, thus getting a very finely divided precipitate which may be washed and dried and is useful wherever a light fluoride is needed. Furthermore, I have found it advantageous to quench into a saturated solution of the fluoride, which also contains a protective colloid which will prevent the growth of the fluoride crystals. Of course, in the case of potassium fluosilicate, since potassium fluoride is quite soluble in water, I would separate the potassium fluoride from the molten solvent by quenching in water and recrystallization. In the case of magnesium fluosilicate, the resulting fusion would be quenched in water and the magnesium fluoride, being insoluble, would be readily separated from the soluble solvent. It is obvious that any fluosilicate may be treated by this method, or the fluosilicate may be decomposed separately and the dense resulting product treated as above to make it light and fluffy. In the event that the fluoride resulting is not soluble in the melt, it can be recovered by suitable devices for mechanically separating it from the melt and in this way the process may be continuous without need of quenching or otherwise cooling the molten bath.

In a similar fashion fluoborates may be converted into useful fluorides and boron trifluoride generated.

I do not limit myself to the use of the specific compositions of molten bath herein described except as set forth in my several claims which I desire may be construed each according to its own limitations and without reference to limitations contained in other claims. Molten sodium chloride is particularly convenient since it melts at an easily obtained temperature, is resistant to decomposition or reaction with the solutes, and produces a particularly limpid melt, as well as being inexpensive. Potassium chloride is even better in some respects, such as exhibiting a large difference in solubility as between hot and cold water, which enables much of it to be recovered by crystallization while sodium chloride requires more evaporation. A mixture of sodium chloride and potassium chloride in molecular proportions exhibits a lower melting point than either salt separately. In addition to these, other inorganic compounds may be employed provided that they do not decompose on heating or enter into undesirable chemical reactions with the solutes or reagents. Solubility of the salt in water is generally desirable, as facilitating the separation of the same from some of the end products of the reaction, but even this is not always necessary when the whole mass is useful as in the example of the fertilizer above described or in case of end products which can be rendered insoluble in the melt. Nor do I limit myself to the specific methods indicated in the description for contacting the reacting substances. It is in some cases advantageous to mix intimately all or part of the reactants and the solvent salts or substances and melt them together while they are being continuously added. I wish my claims to be construed without limitation on the method or order of contacting the reacting substances and solvent salts or substances.

Having thus described my invention what I claim is:

1. The process which comprises contacting a compound of the group consisting of sodium, magnesium and potassium fluosilicates and fluoborates with a molten, anhydrous solvent which is inert thereto and has a decomposition temperature substantially higher than that of such fluosilicate or fluoborate, at a temperature at least as high as the decomposition point of such compound, said solvent being maintained below its own decomposition temperature and being a solvent for said compound and one of its decomposition products and itself soluble in water, and then separating said solvent from the decomposition product dissolved therein.

2. The process which comprises contacting a compound of the group consisting of sodium, magnesium and potassium fluosilicates and fluoborates with a molten, anhydrous solvent which is inert thereto and has a decomposition temperature substantially higher than that of such fluosilicate or fluoborate, at a temperature at least as high as the decomposition point of such compound, said solvent being maintained below its own decomposition temperature and being a solvent for said compound and one of its decomposition products and itself soluble in water, removing a resulting evolved gaseous decomposition product and then separating said solvent from the non-gaseous material resulting from the decomposition.

3. The process which comprises contacting a compound of the group consisting of sodium, magnesium and potassium fluosilicates and fluoborates with a molten, anhydrous solvent which is inert thereto and has a decomposition temperature substantially higher than that of such fluosilicate or fluoborate, at a temperature at least as high as the decomposition point of such compound, said solvent being maintained below its own decomposition temperature and being a solvent for said compound and one of its decomposition products and itself soluble in water, and then separating said solvent from the decomposition product dissolved therein by quenching the mixture into a concentrated aqueous solution of the solute.

4. The process which comprises introducing into a molten, anhydrous solvent of the group consisting of sodium chloride, potassium chloride and mixtures thereof a compound of the group consisting of sodium, potassium and magnesium fluosilicates and fluoborates at a temperature above the decomposition temperature of said compound and then quenching the reaction mixture in a concentrated aqueous solution of the solute.

5. The process which comprises introducing into a molten, anhydrous solvent of the group consisting of sodium chloride, potassium chloride and mixtures of sodium chloride and potassium chloride a compound of the group consisting of sodium, potassium and magnesium fluosilicates and fluoborates at a temperature above the decomposition temperature of said compound and then quenching the reaction mixture in a concentrated aqueous solution of the solute containing a protective colloid.

6. The process which comprises contacting sodium fluosilicate with a molten, anhydrous, water soluble solvent which is inert to sodium fluosilicate and the decomposition products thereof, said solvent having a decomposition temperature higher than that of sodium fluosilicate and being maintained at a temperature above the decomposition temperature of sodium fluosilicate and below its own decomposition temperature for a time sufficient to effect decomposition of said sodium fluosilicate, and then separating said inert solvent from the decomposition products of said sodium fluosilicate by dissolving said solvent in water.

7. The process which comprises contacting sodium fluoborate with a molten, anhydrous, water soluble solvent which is inert to sodium fluoborate and the decomposition products thereof, said solvent having a decomposition temperature higher than that of sodium fluoborate and being maintained at a temperature above the decomposition temperature of sodium fluoborate and below its own decomposition temperature for a time sufficient to effect decomposition of said sodium fluoborate, and then separating said inert solvent from the decomposition products of said sodium fluoborate by dissolving said solvent in water.

HAROLD SIMMONS BOOTH.